Figures 1, 2:
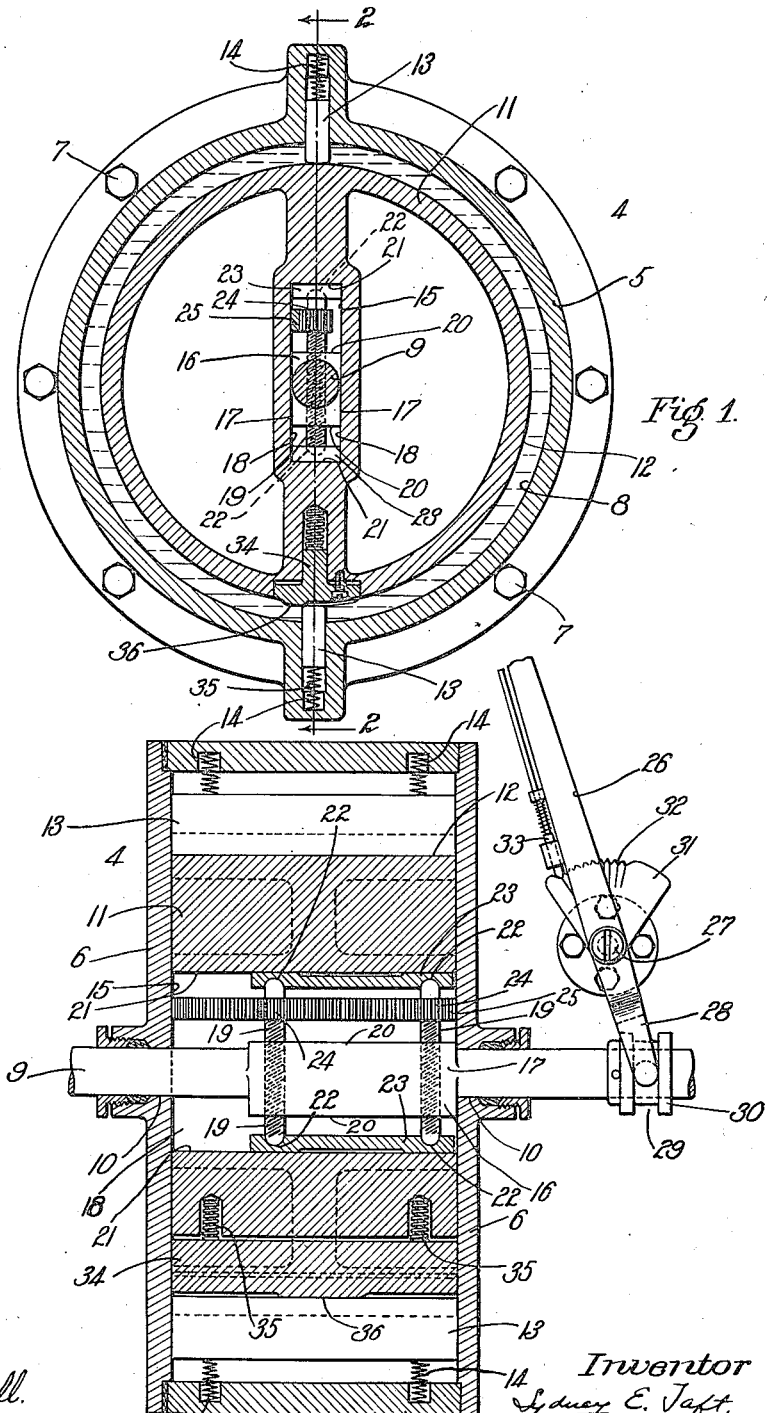

S. E. TAFT.
BRAKE MECHANISM.
APPLICATION FILED DEC. 11, 1913.

1,149,970. Patented Aug. 10, 1915.

Witnesses
Leonard A. Powell.
Franklin E. Low.

Inventor
Sydney E. Taft,
by his attorney,
Charles T. Goodwin.

UNITED STATES PATENT OFFICE.

SYDNEY E. TAFT, OF HOLLISTON, MASSACHUSETTS, ASSIGNOR TO AUTOMATIC AIR BRAKE COMPANY, OF BOSTON, MASSACHUSETTS, A CORPORATION OF MASSACHUSETTS.

BRAKE MECHANISM.

1,149,970. Specification of Letters Patent. Patented Aug. 10, 1915.

Application filed December 11, 1913. Serial No. 806,096.

*To all whom it may concern:*

Be it known that I, SYDNEY E. TAFT, a citizen of the United States, residing at Holliston, in the county of Middlesex and State of Massachusetts, have invented new and useful Improvements in Brake Mechanisms, of which the following is a specification.

This invention relates to brake mechanisms and the invention has for its object the production of a simple, compact and powerful brake of the rotary fluid type which is adapted to gradually or suddenly check or retard the relative movements between two or more members, said checking being accomplished by the operation of a lever which is adapted to move a piston from a position concentric with the median axial line of the chamber of a casing within which said piston is arranged into a position eccentric to said median axial line, whereby when said piston or said casing is rotated relatively to the other the fluid contained within said chamber will be revolved about said median axial line and forced against abutments which project into said chamber against the periphery of said piston and tend to retard the movements of said fluid.

The object of the invention is further to provide means adapted to quickly move said piston, laterally relatively to the shaft upon which said piston is mounted, a greater or less degree according to the degree of retardation required between the relatively moving members.

The invention consists in the combination and arrangement of parts whereby the above objects and certain other objects hereinafter appearing are attained, as set forth in the following specification and particularly pointed out in the claims.

Referring to the drawings: Figure 1 is a transverse section, partly in elevation, of a brake mechanism embodying my invention. Fig. 2 is a longitudinal sectional elevation on line 2—2 of Fig. 1.

Like numerals refer to like parts throughout the several views of the drawings.

In the drawings, 4 is a casing which is preferably formed in three parts, including a cylindrical member 5, and end members 6, which are secured to the member 5 by bolts 7, said members uniting to form a cylindrical fluid chamber 8. A shaft 9 is journaled in the end walls 6 of the casing 4 in bearings 10, suitable packing being provided in the ends of said members to prevent leaking of the fluid from said chamber 8.

A cylindrical piston 11 is mounted on the shaft 9 within the chamber 8 and in non-rotatable relation with said shaft with its opposite ends engaging the inner faces of the end walls 6, while its periphery 12 in its normal position is concentric with the median axial line of the chamber 8 and the axis of the shaft 9.

Abutments 13, preferably two in number, are arranged in the casing 4 diametrically opposite each other and in such a manner that they may engage the periphery 12, while springs 14 are provided to yieldingly retain said abutments in contact with said periphery during the movements of said piston and said casing relatively to each other, allowances being made to permit said abutments to be moved radially toward or away from the axis of the shaft 9 for the purpose hereinafter set forth.

With the piston 11 arranged concentric with the axis of the shaft 9 a relative rotary movement may be created between said piston and said casing without materially agitating the fluid contained within said chamber 8 and thus little or no resistance will be imparted to the moving member.

The preferred method of operating the device is to rotate the shaft 9 together with the cylinder piston 11, while the casing 4 is retained stationary and this movement will continue with the piston concentric with said shaft 9 as long as said relative movement is desired, but when it is necessary to stop or retard the movements of said piston relatively to said casing it becomes necessary to move said piston 11 laterally on said shaft 9, from its position concentric with the axis of said shaft into a position eccentric relatively to said axis, or in contact with the wall of the chamber 8, thus the continued rotary movement of said piston will cause the fluid contained in said chamber to be revolved about said axis and as the point in the periphery of said cylindrical member approaches one or the other of the abutments 13, the fluid will be compressed thereagainst and a consequent retardation of said piston will result.

The piston 11 is provided with a longitudinal slot 15 which is preferably rectangular in cross section, a portion of said slot being occupied by the shaft 9 which is also provided with a somewhat enlarged rectangular portion 16, opposite sides 17 thereof engaging the adjacent opposite sides 18 of the portion constituting said slot 15 and thus preventing said piston from rotating on said shaft.

A plurality of parallelly disposed, sharp-pitched, screws 19 are arranged in screw-threaded engagement with said shaft within said slot 15 and project beyond opposite edges 20 of said rectangular portion terminating adjacent the opposite sides 21 of said piston forming the slot 15, the ends of said screws 19 being preferably hemispherical and engaging hemispherical sockets 22 in gibs 23, which are arranged intermediate said hemispherical ends and the sides 21 and in slidable engagement with said sides.

Each of the screws 19 is further provided with a pinion 24 arranged to mesh with the teeth of a rack 25 secured to one of the faces 17 forming the slot 15 and extending longitudinally of said slot.

To rotate the screws 19, the shaft 9 is reciprocated longitudinally through the bearings 10 causing the pinion 24 to be rotated by the rack 25, which is stationary as to longitudinal movement, while to impart a reciprocatory movement to said shaft a lever 26 is arranged exteriorly of the casing 4, said lever being pivoted at 27 and forked at 28 to straddle the shaft 9. The extremities of said forked end engage an annular groove 29 in the collar 30 secured to the shaft 9.

To lock the lever 26 in the desired positions a quadrant 31 is provided comprising notches 32 which are adapted to receive a spring pressed pawl 33 mounted upon said lever and adapted to be released to permit said lever to be rocked upon the pivot 27, thus reciprocating the shaft 9 and when said lever and said shaft have been moved to the desired position, the spring pawl 33 will be permitted to enter said notches.

To insure a perfect contact between the piston and the wall of the chamber 8, when said piston is arranged eccentrically relatively to the axis of said shaft 9, a piston blade 34 is provided which has a limited radial movement and permits said blade to project only a slight distance beyond the periphery 12 of said piston, while a spring 35 yieldingly retains said piston in said projecting state, the face 36 of said piston being helically disposed relatively to said piston to permit the same to ride easily over or past the abutments 13.

The general operation of the device is as follows: Assuming that the parts are in the positions illustrated in Figs. 1 and 2 a rotary movement is imparted to either the casing 4 or the piston 11, preferably the latter, while the chamber 8 is preferably filled with oil. During the normal operation the piston 11 remains in the position illustrated in said figures, that is, with its periphery concentric with the axis of the shaft 9 and thereby revolves in the oil contained in said chamber without agitating said oil to any extent. When it is desired to retard the movements of said piston or to entirely stop the same, the lever 26 is rocked upon its pivot to reciprocate the shaft 9 longitudinally through the bearings 10, by so doing the pinions 24 will be rotated by the teeth of the rack 25, to rotate the screws 19, the gibs 23 being permitted to slide along the surfaces 21 and thus provide a smooth bearing surface for the ends of the screws 19.

It will be obvious that upon the rotation of said screws 19, in view of the fact that the shaft 9 is not permitted to be moved laterally, the piston 11 will be forced laterally relatively to said shaft toward the wall of the chamber 8 and if said shaft is moved far enough, said piston through its piston blade 36 will engage said wall and should said piston be revolved about the axis of the shaft 9 at this time, the oil contained in said chamber 8 would be forced against one or the other of the abutments 13 as said piston blade approaches said abutments owing to the gradually decreasing cross sectional area of that portion of said chamber between said piston blade and said abutment. Should said piston 11 be moved for only a portion of the distance off center and a slight space be left between the face 36 and the wall of the chamber 8, more or less of said oil would be permitted to escape through said space and thus only partially check the rotation of said piston, the degree to which said piston may be checked being always under the control of the operator.

From the foregoing description it will be seen that simple and efficient means are provided for accomplishing the objects of the invention, but while the elements herein shown and described are well adapted to perform the functions set forth, it is obvious that various minor changes may be made in the proportions, shape and arrangement of the several parts, without departing from the spirit and scope of the invention as defined in the appended claims.

Having thus described my invention, what I claim and desire by Letters Patent to secure is:

1. In a device of the class described, a casing having a fluid chamber, a shaft journaled in said casing, a piston mounted on said shaft within and in concentric relation with the walls of said chamber, means to retain said piston in non-rotatable relation with said shaft, an abutment within said chamber adapted to engage the periphery of said piston, and means adapted to move said piston from its position concentric with, into a position eccentric relatively to the median axial line of said chamber.

2. In a device of the class described, a casing having a fluid chamber, a shaft journaled in said casing, a piston mounted on said shaft within and in concentric relation with the walls of said chamber, means to retain said piston in non-rotatable relation with said shaft, an abutment within said chamber adapted to yieldingly engage the periphery of said piston, and means adapted to move said piston from its position concentric with, into a position eccentric relatively to the median axial line of said chamber.

3. In a device of the class described, a casing having a fluid chamber, a shaft journaled in said casing, a piston mounted on said shaft within and in concentric relation with the walls of said chamber, means to retain said piston in non-rotatable relation with said shaft, an abutment within said chamber adapted to engage the periphery of said piston, means adapted to move said piston from its position concentric with, into a position eccentric relatively to the median axial line of said chamber, and a piston blade mounted in said piston adapted to yieldingly engage the walls of said chamber.

4. In a device of the class described, a casing having a cylindrical fluid chamber, a shaft journaled in said casing, a cylindrical piston mounted on said shaft within and in concentric relation with the walls of said chamber, means to retain said piston in non-rotatable relation with said shaft, an abutment within said chamber adapted to engage the periphery of said piston, and means adapted to move said piston from its position concentric with the cylindrical wall of said chamber into a position to contact with said wall.

5. In a device of the class described, a casing having a cylindrical fluid chamber, a shaft journaled in said casing, a cylindrical piston mounted on said shaft within said chamber and substantially concentric therewith, said shaft and said piston adapted to be rotated relatively to said casing, means adapted to move said piston on said shaft from its position concentric with said chamber into a position eccentric thereto, and a plurality of abutments adapted to engage the periphery of said piston whereby when said piston is eccentrically arranged within said chamber the relative movements between said piston and said casing will be retarded.

6. In a device of the class described, a casing having a cylindrical fluid chamber, a shaft journaled in said casing, a cylindrical piston mounted on said shaft and provided with a longitudinal slot adapted to receive said shaft, a plurality of parallelly disposed screws in screw-threaded engagement with said shaft within said slot, opposite ends of said screws terminating adjacent opposite sides of said slot, means to impart a longitudinal movement to said shaft, means actuated by said longitudinal movement adapted to rotate said screws whereby said cylindrical piston may be moved laterally on said shaft from a position concentric with the median axial line thereof into a position eccentric relatively to said median axial line, and an abutment adapted to engage the periphery of said piston.

7. In a device of the class described, a casing having a cylindrical fluid chamber, a shaft journaled in said casing, a cylindrical piston mounted on said shaft within said chamber and provided with a longitudinal slot adapted to receive said shaft, a plurality of parallelly disposed, sharp-pitched, screws in screw-threaded engagement with said shaft within said slot, opposite ends of said screws terminating adjacent opposite sides of said slot, a pinion on each of said screws, a rack secured to said piston lengthwise of said slot adapted to be engaged by said pinions, means to impart a longitudinal movement to said shaft relative to said piston to rotate said screws whereby said piston may be moved laterally relatively to said shaft, and an abutment adapted to engage the periphery of said piston.

8. In a device of the class described, a casing having a cylindrical fluid chamber, a cylindrical piston arranged within said chamber, said piston having a rectangular slot extending longitudinally thereof, a shaft journaled in said casing having an enlarged rectangular portion adapted to slidably engage said piston within said slot, a plurality of screws in screw-threaded engagement with said shaft within and terminating adjacent opposite sides of said slot, a pinion on each of said screws, a rack arranged within and lengthwise of said slot engaged by said pinions, means adapted to impart a longitudinal movement to said shaft to rotate said screws whereby said piston may be moved laterally relative to said shaft, and a plurality of abutments adapted to yieldingly engage the periphery of said piston.

9. In a device of the class described, a casing having a cylindrical fluid chamber, a shaft journaled in said casing, a cylindrical piston mounted within said chamber and provided with a longitudinal slot adapted to receive said shaft, a plurality of parallelly disposed screws in screw-threaded engagement with said shaft within said slot, opposite ends of said screws terminating adjacent opposite sides of said slot, gibs arranged intermediate the ends of said screws and the adjacent sides of said slot, means to impart a longitudinal movement to said shaft relatively to said piston to rotate said screws whereby said piston may be moved laterally of said shaft, and an abutment adapted to yieldingly engage the periphery of said piston.

10. In a device of the class described, a casing having a cylindrical fluid chamber, a shaft journaled in said casing, a cylindrical piston mounted within said chamber and provided with a longitudinal slot adapted to receive said shaft, a plurality of parallelly disposed screws in screw-threaded engagement with said shaft within said slot, opposite ends of said screws terminating adjacent opposite sides of said slot, gibs arranged intermediate the ends of said screws and the adjacent sides of said slot, means adapted to impart a predetermined longitudinal movement to said shaft to rotate said pinions, whereby said piston may be moved laterally on said shaft toward or away from the wall of said chamber, and an abutment adapted to yieldingly engage the periphery of said piston.

11. In a device of the class described, a casing having a cylindrical fluid chamber, a shaft journaled in said casing, a cylindrical piston mounted within said chamber and provided with a longitudinal slot adapted to receive said shaft, a plurality of parallelly disposed screws in screw-threaded engagement with said shaft within said slot, opposite ends of said screws terminating adjacent opposite sides of said slot, means adapted to impart a predetermined longitudinal movement to said shaft to rotate said pinions, said means including a lever having rotatable engagement with said shaft, a quadrant, a spring pressed pawl carried by said lever adapted to engage said quadrants, and an abutment adapted to yieldingly engage the periphery of said piston.

In testimony whereof I have hereunto set my hand in presence of two subscribing witnesses.

SYDNEY E. TAFT.

Witnesses:
MARGARET E. HORN,
CHARLES T. GOODING.